United States Patent
Wang

(10) Patent No.: US 9,322,471 B2
(45) Date of Patent: Apr. 26, 2016

(54) MUSIC-BASED INDICATION FOR ELECTRONIC TRANSMISSION RANGE SELECTION

(71) Applicant: GM Global Technology Operations LLC, Detroit, MI (US)

(72) Inventor: Orson S. Wang, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 437 days.

(21) Appl. No.: 13/943,103

(22) Filed: Jul. 16, 2013

(65) Prior Publication Data

US 2015/0025762 A1     Jan. 22, 2015

(51) Int. Cl.
*F16H 63/40*     (2006.01)
*F16H 63/48*     (2006.01)
*F16H 59/54*     (2006.01)
*F16H 63/42*     (2006.01)

(52) U.S. Cl.
CPC ............ *F16H 63/40* (2013.01); *F16H 63/48* (2013.01); *F16H 59/54* (2013.01); *F16H 2063/426* (2013.01)

(58) Field of Classification Search
None
See application file for complete search history.

(56) References Cited

U.S. PATENT DOCUMENTS

| 4,495,484 A | * | 1/1985 | Kawakatsu | B60Q 9/001 200/61.64 |
| 6,300,868 B1 | * | 10/2001 | Barr | B60Q 9/001 340/438 |
| 7,232,394 B2 | | 6/2007 | Suzuki et al. | |
| 2013/0252784 A1 | * | 9/2013 | Kinoshita | B60W 10/182 477/92 |

FOREIGN PATENT DOCUMENTS

| CN | 101304899 A | 11/2008 |
| CN | 201633713 U | 11/2010 |
| CN | 203051728 U | 7/2013 |
| DE | 19909496 A1 | 9/2000 |
| WO | 03098075 A1 | 11/2003 |

OTHER PUBLICATIONS

First Office Action for Chinese Application No. 201410337640.1 dated Jan. 4, 2016; Received Jan. 19, 2016; 5 pages.

* cited by examiner

*Primary Examiner* — Erin D Bishop
(74) *Attorney, Agent, or Firm* — Cantor Colburn LLP

(57) ABSTRACT

Music-based electronic transmission range selection for a vehicle is provided. A first signal from a first electronic control unit (ECU) is received that is indicative of an initiation of an electronic park function. The first ECU generates a signal when an operator presses an electronic park button on an electronic shift device. A corresponding first audio function is determined from the first signal and is implemented. It is determined whether a second signal from a second ECU is received, which second signal indicates successful engagement of the park function. If it is not received, a second audio function is implemented and, if it has been received, a third audio function is implemented. The second audio function produces sound that is dissonant with respect to the sound produced by the first audio function, and the third audio function produces sound that is consonant with respect to the first audio function.

20 Claims, 2 Drawing Sheets

MUSIC-BASED INDICATION FOR ELECTRONIC TRANSMISSION RANGE SELECTION

FIELD OF THE INVENTION

The subject invention relates to electronic transmission range selection and, more particularly, to music-based indication for electronic transmission range selection.

BACKGROUND

In the automotive industry, mechanically-shifted transmission range shift mechanisms have given way to electronically-controlled automatic transmission systems (also known as "electronic transmission systems"). Instead of a mechanical connection between a gear shift lever and the vehicle engine, electronic transmission systems employ a serial bus to exchange information about gear shifting functions.

Electronic gear shift levers alter the way in which drivers select transmission states (i.e., park, reverse, neutral, and drive). For example, in some vehicles a button press replaces a shift lever.

Electronic shifting technology brings new failure modes that do not exist with mechanical shifters. In one example, a driver may erroneously perceive that a shift to "park" has resulted in the vehicle transmission successfully engaging in the "park" transmission state by virtue of pressing the "park" button. This error in perception can occur due to a subjective loss in mechanical feel associated with a button press (e.g., the subtle nature of the button press as compared to the more active motion involved with a lever shift).

In addition, the pressure applied to the button may be insufficient to communicate the desired park instructions to the transmission system.

Accordingly, it is desirable to provide driver awareness of vehicle transmission states and changes made thereto.

SUMMARY OF THE INVENTION

In one exemplary embodiment of the invention, a method upon which music-based electronic transmission range selection may be implemented is provided. The method includes receiving a first signal from a first electronic control unit. The first signal is indicative of an initiation of an electronic park function. The first electronic control unit generates a signal when an operator presses an electronic park button on an electronic shift device. The method also includes determining, from the first signal, a corresponding first audio function, implementing the first audio function in the vehicle, and determining whether a second signal from a second electronic control unit is received. The second signal indicates successful engagement of the electronic park function with respect to a park transmission state. If the second signal has not been received, the method includes implementing a second audio function in the vehicle and, if the second signal has been received, the method includes implementing a third audio function in the vehicle. The second audio function produces sound that is dissonant with respect to the sound produced by the first audio function, and the third audio function produces sound that is consonant with respect to the sound produced by the first audio function.

In another exemplary embodiment of the invention, a system upon which music-based electronic transmission range selection may be implemented is provided. The system includes a computer processor communicatively coupled to a vehicle bus and logic configured to execute on the computer processor. The logic implements a method. The method includes receiving a first signal from a first electronic control unit via the vehicle bus. The first signal is indicative of an initiation of an electronic park function. The first electronic control unit generates a signal when an operator presses an electronic park button on an electronic shift device. The method also includes determining, from the first signal, a corresponding first audio function, implementing the first audio function in the vehicle, and determining whether a second signal from a second electronic control unit is received. The second signal indicates successful engagement of the electronic park function with respect to a park transmission state. If the second signal has not been received, the method includes implementing a second audio function in the vehicle and, if the second signal has been received, the method includes implementing a third audio function in the vehicle. The second audio function produces sound that is dissonant with respect to the sound produced by the first audio function, and the third audio function produces sound that is consonant with respect to the sound produced by the first audio function.

In yet another exemplary embodiment of the invention, a computer program product upon which music-based electronic transmission range selection may be implemented is provided. The computer program product includes a computer-readable storage medium having instructions embodied thereon, which when executed by a computer processor causes the computer processor to implement a method. The method includes receiving a first signal from a first electronic control unit. The first signal is indicative of an initiation of an electronic park function. The first electronic control unit generates a signal when an operator presses an electronic park button on an electronic shift device. The method also includes determining, from the first signal, a corresponding first audio function, implementing the first audio function in the vehicle, and determining whether a second signal from a second electronic control unit is received. The second signal indicates successful engagement of the electronic park function with respect to a park transmission state. If the second signal has not been received, the method includes implementing a second audio function in the vehicle and, if the second signal has been received, the method includes implementing a third audio function in the vehicle. The second audio function produces sound that is dissonant with respect to the sound produced by the first audio function, and the third audio function produces sound that is consonant with respect to the sound produced by the first audio function.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment of the invention, techniques for providing driver awareness of vehicle transmission states and changes made thereto are described. The music-based electronic transmission range selection (also referred to as electronic transmission range selection) utilizes musical principles to enhance the driver's awareness of the vehicle's transmission state. An enhanced audible indication may reduce the risk that a driver might attempt to initiate an improper shift to park function or that the driver inadvertently walks away from a vehicle left out of park.

The enhanced audible indication includes audio functions that are designed based on known musical principles to inform a driver of successful shift to park operations, as well as improper or unsuccessful shift to park operations. In an embodiment, a successful shift to park operation will result in audio functions that produce sound that is pleasing to the ear according to known music theory principles (e.g., consonant or harmonious audio tones, sequences, chords, or combinations of thereof). An improper or unsuccessful shift to park operation will result in audio functions that produce sound that is unpleasant to the ear according to the music principles (e.g., dissonant or disharmonious audio tones, sequences, chords, or combinations of these tones and sequences).

Figure 1:
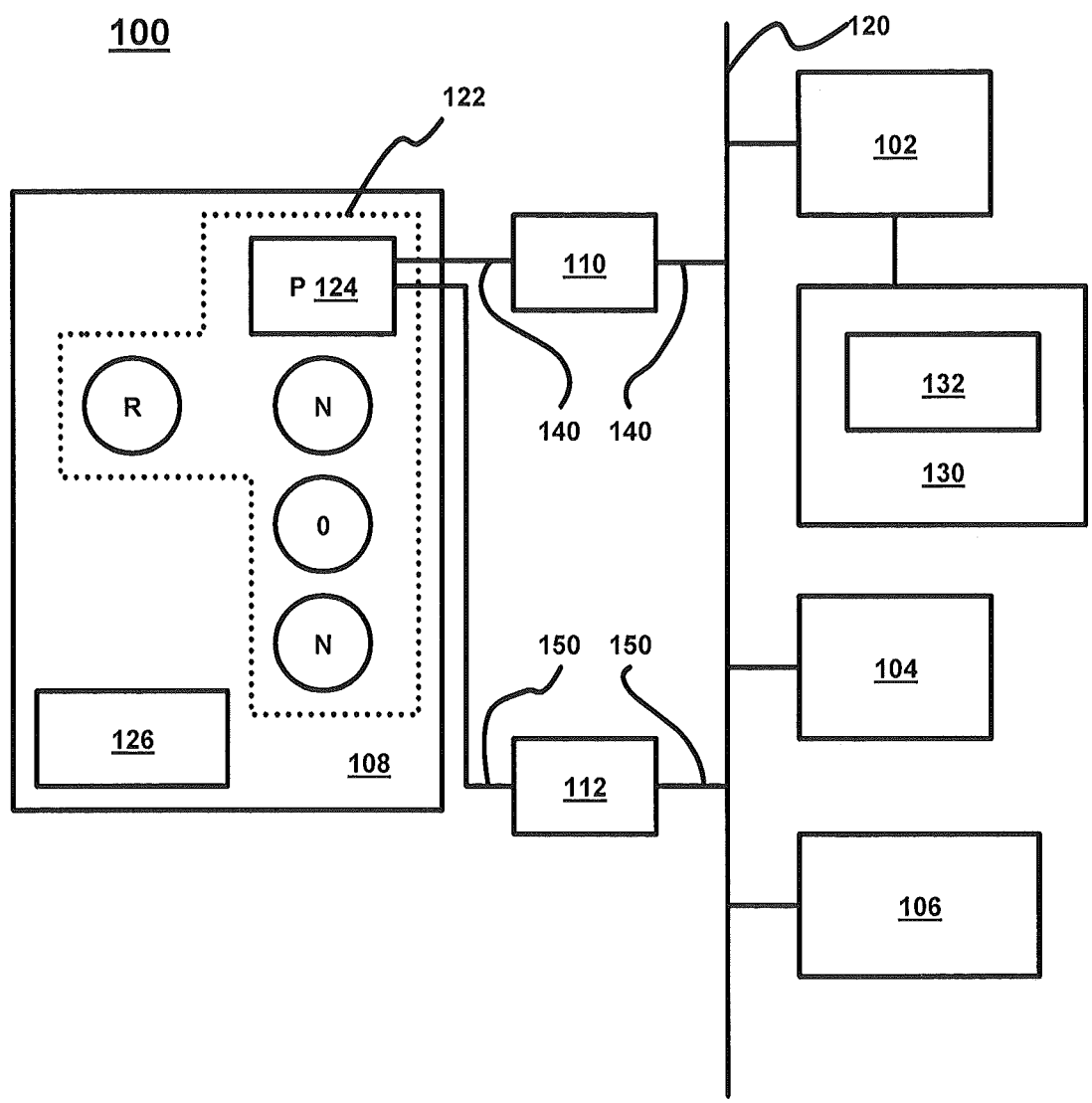
FIG. 1 is a block diagram depicting an electronic shift system for a vehicle in accordance with an embodiment of the invention.

Turning now to FIG. 1, an electronic shift system 100 for a vehicle will now be described.

The system 100 includes a computer processor 102, a storage device 130, a transmission system 106, and an electronic shift device 108, each of which is communicatively coupled to a vehicle network 120. The vehicle network 120 may be implemented using wireless and/or wired means. The vehicle network 120 may be a serial data bus or high-speed bus, such as a local area network.

The computer processor 102 communicates with a storage device 130 to execute logic 132 stored thereon. The logic 132 is configured to implement the music-based electronic transmission range selection. The computer processor 102 includes hardware elements (e.g., circuitry, logic cores, registers, etc.) for processing data configured for the music-based electronic transmission range selection.

The computer processor 102 may employ a timing mechanism that measures time in seconds or fractions thereof to monitor elapsed time between signals transmitted over the vehicle network 120, as will be described herein.

The storage device 130 may be implemented as any type of memory device, such as hard disk memory, virtual memory, random access memory, cache memory, or a combination thereof.

An audio system 104 may include one or more speakers, amplifier, deck, tuner, and digital signal processing unit. In an embodiment, the audio system 104 forms part of an infotainment system. Components of the audio system 104 may be disposed, at least in part, in or near the cabin of the vehicle or in any location that facilitates audible perception, by a vehicle operator, of sound produced by audio functions generated through the audio system 104. In an embodiment, the audio functions are implemented by the audio system 104 based on commands received from the logic 132 via the vehicle network 120 and electronic control unit 110, and the resulting sounds are then transmitted through the vehicle cabin via the speakers. In one embodiment, the decibel level or intensity of the sounds may be configurable via the music-based electronic transmission range selection processes to provide greater awareness or to coincide with the sensitivities of the vehicle operator.

The transmission system 106 may be any electronically controlled vehicle transmission. The transmission system 106 may utilize hydraulics to activate clutches and bands in the system and each hydraulic circuit may be controlled by an electric solenoid.

The electronic shift device 108 includes a shift lever 126 and gear shift positions 122 (e.g., reverse, neutral, and drive), and further includes a park position and selector 124. The electronic shift device 108 electronically controls the gear range through the shift lever 126. Likewise, the electronic shift device 108 controls the park function through the park position and selector 124, which may be implemented as a button. In one embodiment, the electronic shift device 108 is part of a shift-by-wire system.

In an embodiment, the park position and selector 124 is communicatively coupled to an electronic control unit 110 for generating a signal 140 over the vehicle network 120 when the vehicle operator initiates a shift to park function (i.e., presses the selector 124) to place the vehicle transmission 106 in a park state. The signal 140 (also referred to as a first signal) is transmitted to the computer processor 102, and the logic 132 identifies the signal 140, e.g., from packet information such as a header identifying the electronic control unit 110. Thus, the logic 132 determines that the vehicle operator has pressed the park selector 124 from the signal 140.

In an embodiment, the park position and selector 124 is communicatively coupled to a second electronic control unit 112 for generating a signal 150 over the vehicle network 120 when the vehicle operator initiates the shift to park function. The signal 150 (also referred to as a second signal) is transmitted to the transmission 106 via the electronic control unit 112. The transmission 106, e.g., via a controller, identifies the signal 150, e.g., from packet information identifying the electronic control unit 112. The logic 132 may be configured to wait a defined period of time (e.g., 1-2 seconds) then poll the electronic control unit 112 to determine if the transmission 106 is engaged in the park position. Alternatively, the logic 132 may be configured to identify when the shift to park function is improper (e.g., the vehicle is in motion). Audio functions are implemented based on these signals and the polling, as described further herein.

Figure 2:
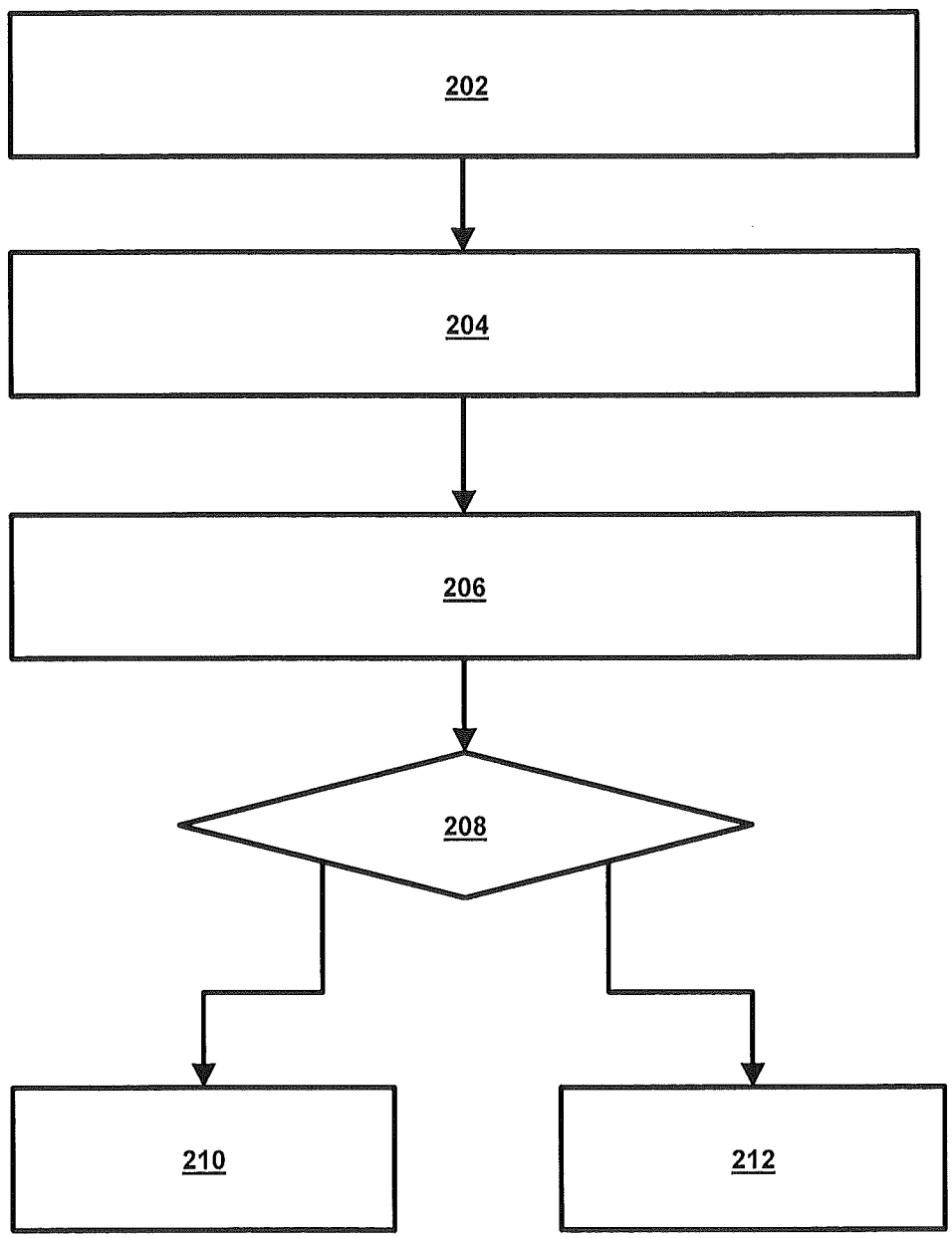
FIG. 2 is a flow diagram of a process for implementing the electronic shift system in accordance with an embodiment of the invention.

Turning now to FIG. 2, a flow diagram describing a process for implementing music-based electronic transmission range selection will now be described.

At step 202, the computer processor 102 receives a first signal 140 from electronic control unit 110 (also referred to herein as a first electronic control unit). The first signal 140 indicates initiation of an electronic park function by a vehicle operator. The first electronic control unit 110 generates the signal 140 when the operator presses an electronic park button 124 on the electronic shift device 108.

At step 204, the logic 132 determines an audio function (also referred to as first audio function) from the first signal 140 and, at step 206, the logic 132 implements the first audio function in the vehicle, e.g., through the audio system 104. As indicated above, the audio function produces sound, such as a tone, a sequence of tones, a chord, or combination thereof. In one embodiment, the first audio function will produce sound that is consonant or pleasing to the ear.

At step 208, the logic 132 determines whether a second signal 150 from a second electronic control unit (electronic control unit 112) received by the transmission 106 (or alternatively, whether the transmission 106 has successfully engaged the vehicle in park). Thus, the second signal 150 indicates successful engagement of the electronic park function with respect to a park transmission state. In a further embodiment, the logic 132 determines whether the shift to park function is improper (e.g., the vehicle is in motion).

At step 210, if the second signal 150 has not been received by the transmission 106, or if the transmission is not engaged in park, or if an improper shift to park operation is determined, the logic 132 implements a second audio function in the vehicle. The second audio function produces sound that is discordant or dissonant with respect to the sound produced from first audio function. As indicated above, the audio function produces sound, such as a tone, a sequence of tones, a chord, or combination thereof. In an embodiment, the second audio function produces sound that is dissonant or discordant either on its own or in relation to the sound produced from the first audio function. For example, a sequence of consonant tones tri-tone consonant chord may be used.

Otherwise, if the logic 132 determines that the second signal 150 has been received by the transmission 106 (or the transmission is successfully engaged in park), the logic 132 implements a third audio function in the vehicle at step 212. The third audio function is harmonious with respect to the first audio function.

The first audio function may be associated with the first electronic control unit 110, and the second and third audio functions may be associated with the second electronic control unit 112. In an embodiment, the first and third audio functions may collectively form a tri-tone. In an alternate embodiment, the sound produced by a successful shift to park operation (second audio function) may be a tone that completes a sequence of a chord used by the first audio function (e.g., where the first audio function generates notes c1, e, and g, and the second audio function generates note c2 (one octave higher than c1). Likewise, an unsuccessful shift to park operation (second audio function) may result in a tone that is out of the sequence expected for the chord or sequence used for the first audio function (e.g., the first audio function generates notes c1, e, and g, and the second audio function generates note c2#).

In yet a further embodiment, the first audio function and the second audio function may generate a sequence that offers no resolution as defined by western tonal music theory (e.g., where a melody or chord is expected to resolve to a certain note or chord, but a different note or chord is generated). In another embodiment, the second audio function may be null or mute leading to a dissonant sound from the first audio function that does not resolve.

Technical effects include the ability to provide driver awareness of vehicle transmission states and changes made thereto. The music-based electronic transmission range selection (also referred to as electronic transmission range selection) utilizes musical principles to enhance the driver's awareness of the vehicle's transmission state. An enhanced audible indication may reduce the risk that a driver might attempt to initiate an improper shift to park function (e.g., while the vehicle is still in motion) or that the driver inadvertently walks away from a vehicle left out of park (thus, reducing the risk of rollaway incidents).

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for music-based electronic transmission range selection for a vehicle, the method comprising:
   receiving a first signal from a first electronic control unit, the first signal indicative of an initiation of an electronic park function, the first electronic control unit generating the first signal when an operator presses an electronic park button on an electronic shift device;
   determining, from the first signal, a corresponding first audio function;
   implementing the first audio function in the vehicle;
   determining whether a second signal from a second electronic control unit is received, the second signal indicating successful engagement of the electronic park function with respect to a park transmission state;
   if the second signal has not been received, implementing a second audio function in the vehicle, the second audio function producing sound that is dissonant with respect to sound produced by the first audio function; and
   if the second signal has been received, implementing a third audio function in the vehicle, the third audio function producing sound that is consonant with respect to the sound produced by the first audio function.

2. The method of claim 1, wherein the sound produced by the first audio function comprises a single tone.

3. The method of claim 1, wherein the sound produced by the first audio function comprises a first portion of a sequence of tones, and the sound produced by the third audio function comprises at least one tone that completes the sequence.

4. The method of claim 1, wherein the determining the second signal has not been received includes waiting a threshold period of time before implementing the second audio function in the vehicle.

5. The method of claim 1, wherein the each of the first audio function, second audio function, and third audio function produces sound through an audio system of the vehicle.

6. The method of claim 1, wherein the second electronic control unit is communicatively coupled to a transmission system in the vehicle through a vehicle bus.

7. The method of claim 1, wherein the first electronic control unit communicatively couples the electronic park button with a vehicle bus.

8. The method of claim 1, wherein the sound produced by the first audio function and the sound produced by the third audio function collectively form a tri-tone.

9. A system for implementing music-based electronic transmission range selection for a vehicle, the system comprising:

a computer processor communicatively coupled to a vehicle bus; and logic executable by the computer processor, the logic configured to implement a method, the method comprising:

receiving a first signal from a first electronic control unit via the vehicle bus, the first signal indicative of an initiation of an electronic park function, the first electronic control unit generating a signal when an operator presses an electronic park button on an electronic shift device;

determining, from the first signal, a corresponding first audio function;

implementing the first audio function in the vehicle;

determining whether a second signal from a second electronic control unit is received, the second signal indicating successful engagement of the electronic park function with respect to a park transmission state;

if the second signal has not been received, implementing a second audio function in the vehicle, the second audio function producing sound that is dissonant with respect to sound produced by the first audio function; and if the second signal has been received, implementing a third audio function in the vehicle, the third audio function producing sound that is consonant with respect to the sound produced by the first audio function.

10. The system of claim 9, wherein the sound produced by the first audio function comprises a single tone.

11. The system of claim 9, wherein the sound produced by the first audio function comprises a first portion of a sequence of tones, and the sound produced by the third audio function comprises at least one tone that completes the sequence.

12. The system of claim 9, wherein the determining the second signal has not been received includes waiting a threshold period of time before implementing the second audio function in the vehicle.

13. The system of claim 9, wherein each of the first audio function, second audio function, and third audio function produces sound through an audio system of the vehicle.

14. The system of claim 9, wherein the second electronic control unit is communicatively coupled to a transmission system in the vehicle through the vehicle bus.

15. The system of claim 9, wherein the first electronic control unit communicatively couples the electronic park button with the vehicle bus.

16. The system of claim 9, wherein the sound produced by the first audio function and the sound produced by the third audio function collectively form a tri-tone.

17. A computer program for music-based electronic transmission range selection for a vehicle, the computer program product comprising a computer-readable storage medium having instructions embodied thereon, which when executed by a computer processor, causes the computer processor to implement a method, the method comprising:

receiving a first signal from a first electronic control unit, the first signal indicative of an initiation of an electronic park function, the first electronic control unit generating a signal when an operator presses an electronic park button on an electronic shift device;

determining, from the first signal, a corresponding first audio function;

implementing the first audio function in the vehicle;

determining whether a second signal from a second electronic control unit is received, the second signal indicating successful engagement of the electronic park function with respect to a park transmission state;

if the second signal has not been received, implementing a second audio function in the vehicle, the second audio function producing sound that is dissonant with respect to sound produced by the first audio function; and if the second signal has been received, implementing a third audio function in the vehicle, the third audio function producing sound that is consonant with respect to the sound produced by the first audio function.

18. The computer program product of claim 17, wherein the sound produced by the first audio function comprises a single tone.

19. The computer program product of claim 17, wherein the sound produced by the first audio function comprises a first portion of a sequence of tones, and the sound produced by the third audio function comprises at least one tone that completes the sequence.

20. The computer program product of claim 17, wherein the determining the second signal has not been received includes waiting a threshold period of time before implementing the second audio function in the vehicle.

* * * * *